(12) United States Patent
Jansen et al.

(10) Patent No.: US 6,587,562 B1
(45) Date of Patent: Jul. 1, 2003

(54) SYNCHRONOUS STREAM CIPHER

(75) Inventors: Cornelis J. A. Jansen, Eindhoven (NL); Petrus L. A. Roelse, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/338,441

(22) Filed: Jun. 22, 1999

(30) Foreign Application Priority Data

Jun. 25, 1998 (EP) .............................................. 98202112

(51) Int. Cl.[7] .............................................. G06F 1/24
(52) U.S. Cl. ...................... 380/262; 713/153; 713/168; 713/200; 713/201
(58) Field of Search .............................. 713/153, 168, 713/200, 201; 370/262

(56) References Cited

U.S. PATENT DOCUMENTS

| | | | |
|---|---|---|---|
| 5,684,714 A | * 11/1997 | Yogeshwar et al. | ......... 370/521 |
| 5,687,191 A | * 11/1997 | Lee et al. | .................. 375/216 |
| 5,696,913 A | * 12/1997 | Gove et al. | ................. 710/317 |

OTHER PUBLICATIONS

"Handbook of Applied Cryptography", A.J. Menzes et al, CRC Press, 1997, pp. 209–211.

* cited by examiner

*Primary Examiner*—Thomas R. Peeso
(74) *Attorney, Agent, or Firm*—Michael E. Belk

(57) ABSTRACT

A synchronous data-stream generator, suitable for use as a synchronous stream cipher providing copy right protection for audio/video data, generates a stream of output data items in synchronisation with a clock trigger. The data-stream generator comprises at least two parallel arranged subgenerators $M_i$, $i \geq 1$, such as linear feedback shift registers. The output of the subgenerators $M_i$ is combined forming the output data items of the data-stream generator. A control subgenerator C is used for generating a stream of control data items. Control means (150) comprises for at least one subgenerator $M_i$ an associated number selector $S_i$ for, in dependence on the control data item of the control subgenerator C, selecting a number $n_{i,j}$ from a group $H_i$ of different integer numbers. At least two numbers of the group $H_i$ are larger than zero. The control means (150) causes the associated subgenerator $M_i$ to provide at the output the selected $n_{i,j}$-th data item successive to a last generated data item (effectively skipping $n_{i,j}-1$ data items).

9 Claims, 2 Drawing Sheets

SYNCHRONOUS STREAM CIPHER

The invention relates to a synchronous data-stream generator for generating a stream of output data items of at least one bit in synchronisation with a clock trigger; the data-stream generator comprising:

a plurality of subgenerators $M_i$, $i \geq 1$, each subgenerator $M_i$ comprising a respective clock input and a respective output; each subgenerator $M_i$ being operative to generate a data item of at least one bit on the respective output in response to a trigger received via the respective clock input;

means for combining a generated data item of each of the subgenerators $M_i$, forming the output data item of the data-stream generator;

a control subgenerator C comprising an input for receiving the clock trigger and an output; the control subgenerator C being operative to generate a control data item of at least one bit on the output in response to the clock trigger; and control means operative to provide a trigger to at least one of the clock inputs of the subgenerators $M_i$ in dependence on the control data item of the control subgenerator C.

The invention further relates to an encryptor and/or decryptor station comprising the synchronous data-stream generator. The invention also relates to an apparatus comprising a decryptor station comprising the synchronous data-stream generator.

The invention further relates to a method for generating an output stream of data items, each of at least one bit in synchronisation with a clock trigger; the method comprises:

generating a control stream of control data items, each of at least one bit, in synchronisation with the clock trigger; and generating a plurality of data streams $DS_i$ of data items, each of at least one bit; each data stream $DS_i$ being generated according to a respective predetermined algorithm $A_i$;

controlling the generation of data items for at least one of the data streams $DS_i$ in dependence on the control data items of the control stream; and forming the output stream by combining the generated data streams $DS_i$.

The invention relates also to a computer program for performing the method and a computer-readable storage medium having the program recorded thereon.

Such a synchronous data-stream generator is known as the alternating step generator from "Handbook of Applied Cryptography", A. J. Menzes, P. C. van Oorschot, S. A. Vanstone, CRC Press, 1997, pages 209–211. In this system, two Linear Feedback Shift Registers (LFSRs) M1 and M2 are used to generate two data-streams. The data-streams are combined into one bit output stream of the data-stream generator via an XOR (Exclusive OR) operation. A third LFSR C is used as a control subgenerator whose output controls the clocking of the LFSRs M1 and M2. The sequence of operation is as follows:

register C is clocked if the output of C is a logic "1", then $M_1$ is clocked; $M_2$ is not clocked but its output is repeated if the output of C is a logic "0", then $M_2$ is clocked; $M_1$ is not clocked but its output is repeated the outputs of $M_1$ and $M_2$ are combined.

Non-linearity is introduced in this system by using C to irregularly clock one of the subgenerators at a time under control of the output of the subgenerator C. The data stream generator can be used in many applications. For instance, the data-stream generator may be used as a pseudo-random generator, and as such can be used for encrypting/decrypting data by adding the output bits modulo 2 (XOR) to the data bits.

It is an object of the invention to provide a synchronous data-stream generator of the kind set forth which is more resistant against known attacks. It is a further object to provide such an improved data-stream generator that is suitable for use in digital consumer electronics systems with a low gate-complexity for a hardware implementation and offering a speed suitable for encryption/decryption of digital audio/video signals.

To meet the object of the invention, the control means comprises for at least one subgenerator $M_i$ an associated number selector $S_i$ for, in dependence on the control data item of the control subgenerator C, selecting a number $n_{i,j}$ from a group $H_i$ of different integer numbers; at least two numbers of the group $H_i$ being larger than zero; the group $H_i$ being associated with the number selector $S_i$; and in that the control means is operative to cause the associated subgenerator $M_i$ to provide at the output the selected $n_{i,j}$-th data item successive to a last generated data item. In this way, the subgenerator(s) $M_i$ is triggered/clocked more irregularly causing a higher level of non-linear behaviour. Instead of approximately half of the time the subgenerator not being clocked (i.e. maintaining the same output), the group may be larger with at least two integers being different from zero, allowing the subgenerator to be clocked more frequently (i.e. the output is less frequently kept constant which is the result of a 'zero' being selected for the subgenerator and consequently the subgenerator not being clocked whereas another one is being clocked) and being provided with more than one trigger at a time (i.e. in fact skipping a number of $n_{i,j}-1$ data items and providing the $n_{i,j}$-th data item at the output). Such a skipping may simply be performed by in response to one clock trigger to the data-stream generator, clocking a subgenerator $n_{i,j}$ times. By not or less frequently maintaining the same output of a subgenerator, the data stream generator has more states. The hardware/software required to achieve this can be kept to a minimum, making the improvements suitable for high-speed consumer electronic applications.

A data item may simply consist of one bit (0 or 1), or be formed using more bits, representing a larger range of numbers. Combining the output of the subgenerators may be done using a simple operation, such as a bitwise XOR, or may be a more complicated (non-)linear operation.

In an embodiment according to the measure as defined in the dependent claim 2, the balanced selection is an effective way to ensure maximum period.

According to the measure defined in the dependent claim 3, the subgenerator is always clocked at least once, ensuring that the combined output always contains a new contribution of each of the subgenerators. Selecting from two numbers, of which one number is a 'one' allows for a simple and fast implementation.

According to the measure defined in the dependent claim 4, at least two subgenerators are 'irregularly' and differently clocked, increasing the non-linearity further.

According to the measure defined in the dependent claim 5, a finite state machine is used as a generator.

According to the measure defined in the dependent claim 6, a feedback shift register is used as the finite state machine, allowing a simple and fast implementation suitable for consumer electronic applications. The feedback shift register may have a linear feedback or, alternatively, a non-linear feedback.

According to the measure defined in the dependent claim 7, the $n_{i,j}$-th output data item is generated in one operation (one trigger) instead of using $n_{i,j}$ successive clock triggers. In this way a high bit-rate can be achieved at an only marginal increase in gate-complexity. This makes the stream generator particularly suitable for use in digital audio/video equipment, such as a CD or DVD-like player, where a high bit-rate at low cost is required.

According to the measure defined in the dependent claim 8, more output bits of the control data item are used, increasing the variability in the number selection process.

Preferably, the data-stream generator is used in an encryptor and/or decryptor station for generating a pseudo-random stream of data items. Symmetrical encryption/decryption can then be achieved by combining (e.g. using an XOR operation) the generated data stream with a stream to be encrypted/decrypted. Advantageously, the decryptor is incorporated in a playback device, such as a disc player, where the data stream to be encrypted is read from a record carrier, such as a tape or disc. The encryptor and decryptor may also be used for protecting transfer of digital data, in particular audio and/or video data, via a network such as IEEE 1394. In such a case, raw digital data is encrypted in the transmitter station and decrypted in the receiving station. Key information may be provided in any suitable way, such as using public key exchange methods.

It is an object of the invention to provide a method for generating a synchronous data-stream, which is more resistant against known attacks. It is a further object to provide such method that is suitable for use in digital consumer electronics systems with a low gate-complexity for a hardware implementation and offering a speed suitable for encryption/decryption of digital audio/video signals.

To meet the object of the invention, the method is characterised in that the step of controlling the generation of data items for at least one of the data streams $DS_i$ comprises selecting for the data stream $DS_i$ a number n from an associated group of different integer numbers; at least two numbers of the groups being larger than zero; the selection being in dependence on the control data items of the control stream; and the step of generating a data item for the data stream $DS_i$ comprises generating as a next data item of the data stream $DS_i$ a data item which according to the algorithm $A_i$ would be the n-th data item successive to a last generated data item.

In this method, the algorithm $A_i$ corresponds to the functionality of subgenerator $M_1$ and as such will not be described in detail separately.

The invention also relates to computer program for causing a processor to perform this method. The program may be for any suitable processor, such as an embedded microcontroller or Risc-processor, or for processors optimized for executing encryption software. Implementing the steps of the method in software functions lies within the skills of a skilled person and will not be elaborated further.

The invention also relates to a computer-readable storage medium having the computer program. Any suitable medium may be used, like a magnetic storage medium (e.g. floppy disk), or optical storage medium, such as a CD-ROM, or electrical storage medium, such as (non-volatile) RAM or ROM.

These and other aspects of the invention will be apparent from and elucidated with reference to the embodiments shown in the drawings.

Figure 1:
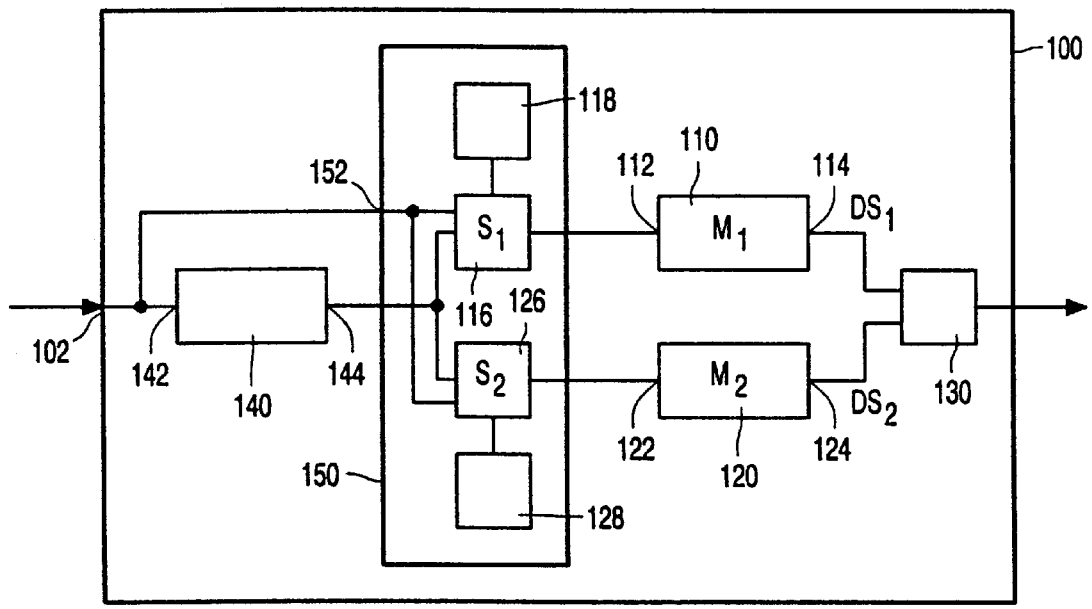
FIG. 1 shows a block diagram of the synchronous data-stream generator 100 according to the invention.

FIG. 1. The shown generator 100 comprises two subgenerators 110 ($M_1$) and 120 ($M_2$). The subgenerators $M_1$ and $M_2$ comprise a respective input 112 and 122 for receiving a clock trigger. In response to a clock trigger received via the respective inputs 112 and 122, the subgenerators $M_1$ and $M_2$ provide a data item at the respective output 114 and 124. This results in respective streams of data items $DS_1$, and $DS_2$. Typically, each data item consists of one bit. However, it will be appreciated that the data item may have any desired value range, e.g. expressed using more than one bit. Preferably, the output data items of the subgenerators are from the same range. The generator 100 comprises combination means 130 for combining the data items generated by the subgenerators $M_1$ and $M_2$. A simple way of combining the data streams $DS_1$, and $DS_2$ is to use a bit-wise XOR operation. It will be appreciated that although only two subgenerators $M_1$ and $M_2$ are shown, equally well more than two subgenerators can be arranged in parallel and their output combined. Using more subgenerators will in general increase the period of the data-stream generator 100 and increase the linear complexity, at the expense of requiring more hardware or software processing for the implementation.

The data-stream generator 100 further comprises a control subgenerator 140 (C). The control subgenerator C comprises an input 142 for receiving a clock trigger. The input 142 is coupled to the clock input 102 of the data-stream generator 100. In response to the clock trigger, the subgenerator C provides a control data item at the output 144. The control data item of the subgenerator C is used to control the clocking of the subgenerators $M_i$ (in FIG. 1, $1 \leq i \leq 2$). Since the generated control data item normally is not combined with the output data items of $M_i$, the size of the control data item may be chosen independently of the size of the data items of the subgenerators $M_1$ and $M_2$.

The data-stream generator 100 also comprises a control means 150. The control means 150 comprises a clock input 152 for receiving a clock trigger. Preferably, the clock input 152 is coupled to the clock input 102 of the data stream generator 100, ensuring that the control means 150 operates synchronous with the control subgenerator C. However, also a separate clock may be used, as long as the output of the data-stream generator 100 is synchronous with the clock trigger received via the clock input 102. The control means 150 further comprises a number selector. The number selector selects a number $n_i$ from a predetermined group of different integer numbers. The selection is performed in dependence on the control data item of the control subgenerator C. The control means 150 is operative to, in response to the clock trigger, cause a selected one of the subgenerators $M_i$ to provide at the output the $n_i$-th data item successive to a last output data item. This may, for instance, be implemented by, for $n_1=3$, providing three clock triggers to $M_1$. So, in this way one clock trigger at input 152 may, depending on the value of the control data item, result in providing e.g. 3 triggers to input 112 of $M_1$. The number selector preferably stores the numbers of the group in a memory (e.g. in ROM or RAM whose content is loaded from a non-volatile memory such as a record carrier). Alternatively also other means, such as an algorithm may be used to generate a number. In principle, the number selection and related triggering according to the invention may be performed for only one of the subgenerators. Preferably, a number selection is performed for each of the subgenerators $M_i$, which number determines how many times $M_i$ is 'clocked'. This selection may be done using only one number selector, which in turn selects a number for the various subgenerators $M_i$. In order to increase speed, preferably, the control means 150 comprises a respective number generator $S_i$ for each respective subgenerator $M_i$. In FIG. 1, number generator 116 ($S_1$) is associated with the subgenerator $M_1$ and number generator 126 ($S_2$) with subgenerator $M_2$. In the example, each of the number generators 116 and 126 comprises a respective memory 118 and 128 for storing the respective group $H_i$ of numbers $n_{i,j}$. Advantageously, at least two of the groups $H_i$ are different. Preferably, all groups $H_i$ are different.

According to the invention, the group $H_i$ comprises at least two different integer numbers, of which at least two numbers are larger than zero. For instance, possible groups are: 1 and 3; 1 and 5; 0, 1 and 7; 0, 3 and 11, etc. Preferably, the group does not include the integer zero. In this way, each clock trigger to the data-stream generator 100 results in the subgenerator $M_i$ associated with the group being 'clocked' at least once. Preferably, the group does include the integer one, since in general it is simple to cause a subgenerator $M_i$ to generate the next data item at the output (e.g. by simply providing one clock trigger to the subgenerator $M_i$). It will be appreciated that according to the invention at least one subgenerator $M_i$ is controlled in the manner as described above, where the number of triggers is selected from an associated group $H_i$ with at least two integers larger than zero. Preferably, all subgenerators are controlled in this way. However if so desired, one or more of the subgenerators may also be controlled by selecting a number from the group {0, 1}.

Preferably, the group $H_i$ consists of only two integers, of which a first one, advantageously, is a one and a second one is larger than one. In this way the control means 150 only needs to take a simple binary decision on which number to use for 'clocking' the subgenerator. Such a decision can be based on one output bit of the control subgenerator C.

In a further embodiment, the number selector $S_i$ is operative to perform a balanced selection where each of the numbers $n_{i,j}$ of group $H_i$ has a substantially same chance of being selected. This can be achieved in various different ways. For instance, by using a control subgenerator C with a balanced output and maintaining this balance during the selection (e.g. directly using one bit of the balanced control data item to select between two numbers of $H_i$, where $H_i$ consists of only two numbers).

In a further embodiment a finite state machine is used by a subgenerator to create a pseudo-random stream of data items. Preferably, all subgenerators $M_i$ and the control subgenerator C are based on finite state machines. Advantageously, different machines are used for each subgenerator. For a finite state machine, a clock trigger causes a state transition of the machine, where a state transition results in outputting a data item. If according to the invention $n_{i,j}$ is larger than one, then $n_{i,j}-1$ outputs need to be suppressed (for instance, sampling of the output is only enabled after $n_{i,j}$ state transition triggers have been provided to the finite state machine). Any suitable finite state machine may be used. For instance, DES may be used in an output feedback mode.

Figure 2:
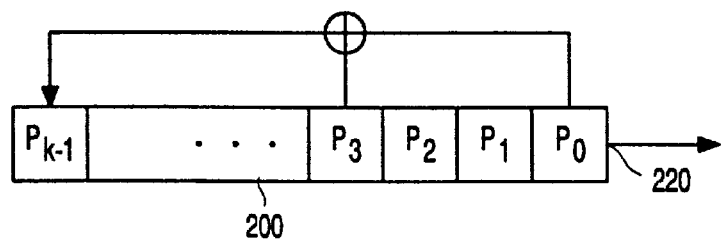
FIG. 2 illustrates a feedback shift register.

Advantageously, the finite state machine is based on a feedback shift register. Any suitable feedback shift register may be used. FIG. 2 illustrates a feedback shift register 200. The register 200 comprises k sequentially arranged storage cells $p_0$ to $p_{k-1}$. In the example, $p_0$ is the low-order cell from which the output data item is supplied. Typically, a data item is one bit, but a cell may also be able to store more bits. In response to a trigger received via the input 210, the content of all cells is shifted over, usually, one location towards the low order cell. Since normally the trigger is a clock pulse, this can be seen as a transition in time from t to t+1. The shift can be expressed using the following formula $$p_i^{(t+1)} = p_{(i+1)}^{(t)}, \text{ for } i=0 \text{ to } k-1$$

The previous content of $p_0$ (i.e. $p_0^{(t)}$) has been made available at the output 220 of the register 200. Due to the shift, cell $p_K$ has become empty. This cell is reloaded with a combination of the data items in one or more of the other cells at time t. Shown is a simple linear combination, where the content of $p_0^{(t)}$ and $p_3^{(t)}$ are combined using a bit-wise XOR operation.

$$p_k^{(t+1)} = p_0^{(t)} \oplus p_3^{(t)}$$

The shown linear feedback shift register (LFSR) can be represented by the following polynomial:

$$f(x) = x^k + x^3 + 1$$

In this formula, for n-bit storage cells, $f(x) \in F_{2^n}[x]$. The LFSR can be in one of $2^k-1$ internal states (the state with all zeros is not used). A pseudo-random sequence of $2^k-1$ output items without any repetition of the output occurs if the representing polynomial is a so-called primitive polynomial. Primitive polynomials are well known for various degrees of the polynomials. Preferably LFSRs based on primitive polynomials are used for each subgenerator based on an LFSR. Such primitive polynomials are well known for various degrees of the polynomials. For a simple implementation in hardware, preferably a sparse polynomial is used (i.e. a polynomial with only a few coefficients), requiring only a small amount of logic to implement the feedback function. It will be appreciated that instead of a linear feedback function also a non-linear feedback function may be used.

A conventional FSR can be caused to output the n-th data item, where n>1, following the last output data item by providing n triggers (clock pulses) to the FSR. For high speed applications, the resulting form of clock multiplication (one input clock trigger provided to the data stream generator 100 resulting in n internal triggers to an FSR) may be a problem. According to the invention, for LFSRs the n-th data item is supplied using only one internal trigger at the expense of some additional logic. This is illustrated for the LFSR represented by the polynomial:

$$f(x) = x^7 + x^3 + 1$$

A shift over one position (n=1) can be described as:

$$p_i^{(t+1)} = p_{i+1}^{(t)}, \text{ for } i=0 \text{ to } 5;$$

$$p_6^{(t+1)} = p_0^{(t)} \oplus p_3^{(t)}, \text{ or equivalent: } p_i^{(t+1)} = p_{i-6}^{(t)} \oplus p_{i-3}^{(t)}, \text{ for } i=6$$

Similarly a shift over two positions (n=2) can be described as:

$$p_i^{(t+1)} = p_{i+2}^{(t)}, \text{ for } i=0 \text{ to } 4;$$

$$p_5^{(t+1)} = p_0^{(t)} \oplus p_3^{(t)} \text{ and } p_6^{(t+1)} = p_1^{(t)} \oplus p_4^{(t)}, \text{ or equivalent: } p_i^{(t+1)} = p_{i-5}^{(t)} \oplus p_{i-2}^{(t)}, \text{ for } i=5 \text{ to } 6$$

A shift over three positions (n=3) can be described as:

$$p_i^{(t+1)} = p_{i+3}^{(t)}, \text{ for } i=0 \text{ to } 3;$$

$p_i^{(t+1)}=p_{i-4}^{(t)} \oplus p_{i-1}^{(t)}$, for $i=4$ to 6

Figure 3:
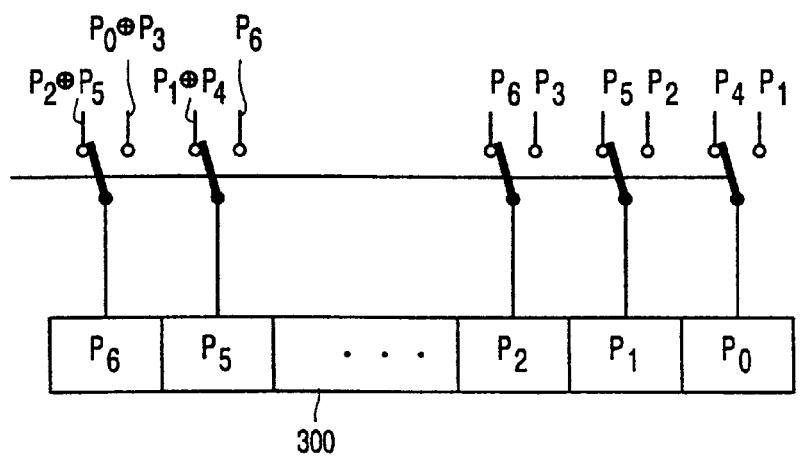
FIG. 3 illustrates a 'one-clock, multi-step/feedback' LFSR.

FIG. 3 illustrates a possible implementation of this principle where the LFSR is associated with group H={1, 3} (i.e. a shift over one position or three position occurs). For each cell a respective switch 310 to 370 has been added, where a first position corresponds to the conventional feedback (n=1) and the second position corresponds to the newly defined feedback which has the same effect as three successive conventional shifts and feedbacks. For above defined polynomial, the same 'one-trigger, multiple shift/feedback' principle can also be executed for n=4:

$p_i^{(t+1)}=p_{i+4}^{(t)}$, for $i=0$ to 2;

$p_i^{(t+1)}=p_{i-3}^{(t)} \oplus p_i^{(t)}$, for $i=3$ to 6

In more general terms for the polynomial $f(x)=x^7+x^3+1$ a shift over n positions (with $1 \leq n \leq 4$) in one operation is given by:

$p_i^{(t+1)}=p_{i+n}^{(t)}$, for $i=0$ to $7-n$;

$p_i^{(t+1)}=p_{i-7+n}^{(t)} \oplus p_{i-4+n}^{(t)}$, for $i=7-n+1$ to 6

Generalising the principle for any LFSR with a characteristic polynomial given by:

$$f(x) = x^k + \sum_{i=0}^{k-n} a_i x^i,$$

$1 \leq n < k$, gives that in response to the trigger to transit in time from t to t+1 the following shifting of data items between the storage cells needs to be performed in parallel:

$p_i^{(t+1)}=p_{i+n}^{(t)}$, for $i=0$ to $k-n-1$;

$$p_i^{(t+1)} = \sum_{j=0}^{k-n} a_j p_{j+i+n-k},$$

for i=k−n to k−1
In this way a fast implementation is achieved, avoid complications of 'internal feedback loops'. Such an internal feedback loop occurs if the highest order cell needs to be fed with a data item which is not yet explicitly present in the register, i.e. the item first needs to be created from items which are present. This situation, for instance, occurs for the sample polynomial of $f(x)=x^7+x^3+1$ if five internal shifts/feedbacks occur in response to one general trigger. To illustrate this, extending the principle described above for n=5 would give:

$p_i^{(t+1)}=p_{i+4}^{(t)}$, for $i=0$ to 1;

$p_i^{(t+1)}=p_{i-2}^{(t)} \oplus p_{i+1}^{(t)}$, for $i=2$ to 6 which for $p_6$ gives: $p_6^{(t+1)}=p_4^{(t)} \oplus p_7^{(t)}$, where actually cell $p_7$ does not exist (in fact a form of a double feedback occurs: once $p_6$ is fed-back in the conventional way, followed by a feedback of the new content of $p_6$ to $p_6$ (in combination with $p_3$)). Realising that the content of $p_7$ corresponds to the content of $p_6$ after one normal shift operation and as such:

$p_7^{(t)}=p_0^{(t)} \oplus p_3^{(t)}$, this gives: $p_6^{(t+1)}=p_0^{(t)} \oplus p_3^{(t)} \oplus p_4^{(t)}$.

As such it will be appreciated that the general principle described above can be expanded, albeit at the expense of more logic or operations (in the example two instead of one XOR operation).

Figure 4:
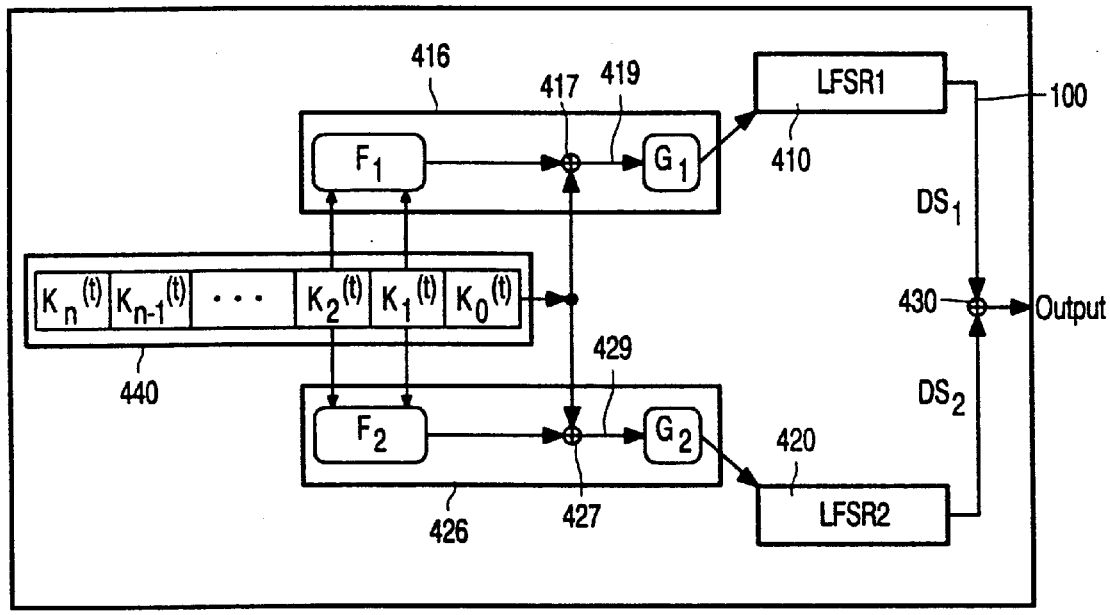
FIG. 4 shows a block diagram of a preferred embodiment of the data-stream generator.

In a further embodiment, the control data items of the control subgenerator C comprise a plurality of L bits. At least one and, preferably, all number selectors $S_i$ comprise mapping means for mapping the L bits of the control data item, as output by the control subgenerator, to one of the integers $n_{i,j}$ of the corresponding group $H_i$. In principle any suitable mapping may be used. Advantageously, a balanced mapping is used. FIG. 4 illustrates a preferred arrangement for mapping multiple bits (in the example: L is three bits) to one of the integers (in the example: the integer is selected from a group of two integers). In the example, two subgenerators LFSR1 (410) and LFSR2 (420) are used, each with a respective number selector 416 and 426. Each of the number selectors comprises a respective boolean function $F_i$ for mapping more than one bit to one bit. In the example, two bits ($k_2$ and $k_1$) are mapped to one bit. The mapping may be chosen in a fixed way, such as shown in the following table:

|  | $k_2^{(t)} k_1^{(t)}$ | | | |
|---|---|---|---|---|
|  | 00 | 01 | 10 | 11 |
| $F_1$ | 1 | 1 | 0 | 1 |
| $F_2$ | 0 | 1 | 0 | 1 |

According to the value in the table, if $k_2^{(t)}k_1^{(t)}$='01' (binary), both $F_1$ and $F_2$ generate as output a binary '1', whereas if $k_2^{(t)}k_1^{(t)}$='00', $F_1$ generates a '1' and $F_2$ generates a '0'. Alternatively, the mapping table may be loaded to a configurable initial value, e.g. from a key. In the arrangement of FIG. 4 it is preferred that $F_1$ and $F_2$ perform a different mapping. The functions $F_1$ and $F_2$ may be chosen such that their output is balanced. In the shown arrangement it is not required that $F_1$ and $F_2$ provide a balanced output. Balancing is achieved by combining the outputs of the functions with an output bit $k_0^{(t)}$ of the control subgenerator C, assuming that this output is balanced (which is the case for an LFSR). In the arrangement, respective functions $G_i$ are used to map the two respective bit streams 419 and 429 to respective streams of numbers, selected from respective groups $H_i$, which numbers determine the number of 'internal clocking' of the respective subgenerators $M_i$. Examples of suitable groups of numbers are: $H_1$={1, 5} and $H_2$={1, 7}. The functions $G_i$ may be defined as follows:

$G_1(0)=1; G_1(1)=5,$ $G_2(0)=1; G_2(1)=7,$

Alternative mapping functions may also be used for $G_i$. Assuming that the subgenerators $H_i$ are finite state machines with a period $q_i$, then the functions $G_i$ preferably meet the following criterion in order to obtain optimal non-linear behaviour and length of the period of the overall generator 100: assuming that $p_i$ is the smallest period of the stream of input bits for $G_i$ and $a_i$ and $b_i$ respectively indicate the number of binary '0's and '1's during this period ($p_i=a_i+b_i$), then the $\gcd(a_i G_i(0)+b_i G_i(1),q_i)=1$. A similar criterion applies for groups with more than two numbers.

The arrangement of FIG. 4 in combination with the internal multiple shifting/feedback technique of FIG. 3 for LFSR1 and LFSR2 can be implemented in hardware using less than 2000 gates for registers of approx. 35 one-bit cells, and can operate at bit rates of over 80 Mbps using conventional techniques, such as standard programmable devices. Obviously, the system may also be implemented using software techniques.

Figure 5:
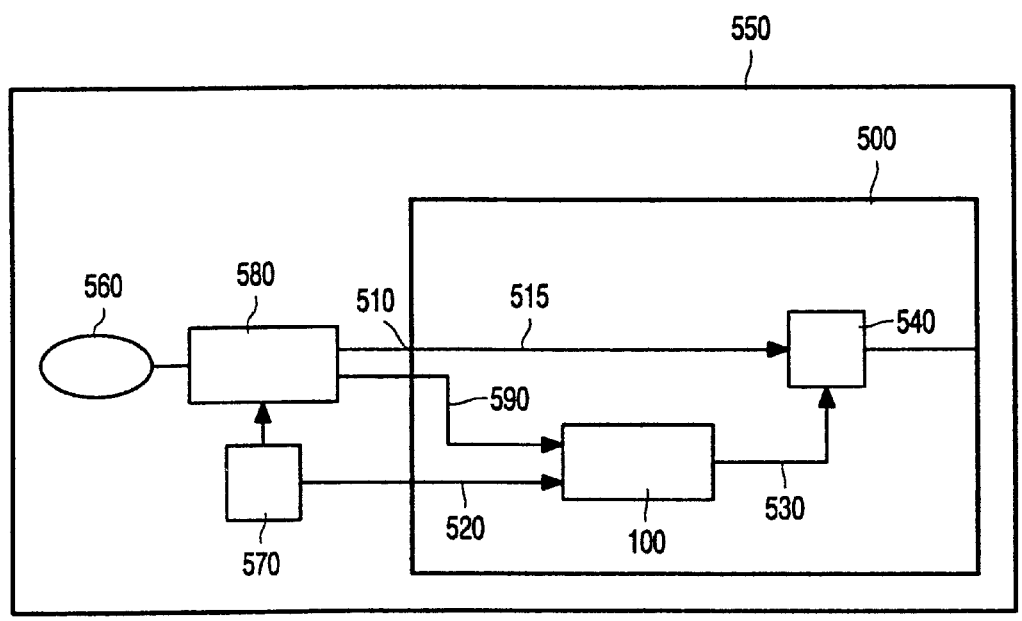
FIG. 5 illustrates an encryptor/decryptor apparatus.

FIG. 5 illustrates a block diagram of an encryptor or decryptor station 500. The station 500 comprises an input 510 for receiving a stream 515 of encrypted, respectively, decrypted data items in synchronisation with a clock trigger 520. The clock may be generated internally to the apparatus or be accompanying the stream of data items. The station further includes the data-stream generator 100 according to the invention. The clock trigger 520 is supplied as input to the data stream generator 100, which in response generates a synchronous stream 530 of data items. The station 500 comprises combination means 540, such as an XOR operator, for combining the received data stream 515 with the generated data steam 530. By using a same stream generator 100 (i.e. a same generation function used under control of the same initial values, such as a key) in both an encryptor station as well as a decryptor station a so-called symmetrical encryption system is achieved. Advantageously, the encryptor station is used to encrypt digital audio/video data, which is then stored in an encrypted form on a record carrier, such as an optical storage medium, or is transmitted in an encrypted form, e.g. via Internet. The encrypted data may then be made readily accessible to a reader/receiver apparatus, whereas access to the key is restricted to the decryptor station in the reader/receiver station. Such a restricted access may, for instance, be achieved using public key encryption methods to transfer the key in an encrypted form. With such techniques it can be assured that only an authorised receiver receives the key and is able to decrypt the data. For distribution via a storage medium, special authorised hardware may be used in the reader to extract the key from the storage medium. The key may be stored in the storage medium in a way not accessible to the normal data read-back hardware. Preferably, such a key is then supplied to the decryptor station in a way not normally accessible from the outside. For instance, the key read-back hardware and the decryptor station may be incorporated in the same IC, which may even be made tamper-resistant. FIG. 5 illustrates using a decryptor station 500 in a reader/playback apparatus 550. The apparatus 550 comprises a storage medium 560. Instead of permanently comprising the storage medium (record carrier), the apparatus may also comprise berthing means, such as a tray, for receiving the storage means. The apparatus 550 comprises a clock 570, providing the timing for the reading/supply of data from the storage medium to the decryptor station 500. The reading is performed by a reader 580, which provides the data stream 515. The reader 580 also retrieves data, such as a key, for initialising the decryptor station 500. The initialisation data 590 is supplied to the decryptor station. It will be appreciated that a similar reverse arrangement can be used for encrypting data and storing the data in encrypted form, if required in combination with the used initialisation data.

Using the encryption/decryption according to the invention the content owner or distributor achieves an effective copyright protection, which particularly for consumer electronics receiver/reader apparatuses can be implemented in a cost-effective manner.

What is claimed is:

1. A synchronous data-stream generator for generating a stream of output data items of at least one bit in synchronisation with a clock trigger; the data-stream generator comprising:

a plurality of subgenerators $M_i$, $i \geq 1$, each subgenerator $M_i$ comprising a respective clock input and a respective output; each subgenerator $M_i$ being operative to generate a data item of at least one bit on the respective output in response to a trigger received via the respective clock input;

means for combining a generated data item of each of the subgenerators $M_i$, forming the output data item of the data-stream generator;

a control subgenerator C comprising an input for receiving the clock trigger and an output; the control subgenerator C being operative to generate a control data item of at least one bit on the output in response to the clock trigger; and control means operative to provide a trigger to at least one of the clock inputs of the subgenerators $M_i$ in dependence on the control data item of the control subgenerator C; characterised in that the control means comprises for at least one subgenerator $M_i$ an associated number selector $S_i$ for, in dependence on the control data item of the control subgenerator C, selecting a number $n_{i,j}$ from a group $H_i$ of different integer numbers; at least two numbers of the group $H_i$ being larger than zero; the group $H_i$ being associated with the number selector $S_i$; and in that the control means is operative to cause the associated subgenerator $M_i$ to provide at the output the selected $n_{i,j}$-th data item successive to a last generated data item.

2. A clock-controlled data-stream generator as claimed in claim 1, characterised in that the number selector $S_i$ is operative to perform a balanced selection where each of the numbers $n_{i,j}$ of group $H_i$ has a substantially same chance of being selected.

3. A clock-controlled data-stream generator as claimed in claim 1, characterised in that at least one of the groups $H_i$ consists of the integer one and one integer larger than one.

4. A clock-controlled data-stream generator as claimed in claim 1, characterised in that the subgenerator $M_i$ and/or the control subgenerator C comprises a finite state machine for creating a pseudo-random stream of data items.

5. A clock-controlled data-stream generator as claimed in claim 1, characterised in that the control data item of the control subgenerator C comprises a plurality of L output bits; and in that the number selector $S_i$ comprises mapping means for mapping the L output bits to one of the integers $n_{i,j}$ of the group $H_i$.

6. A clock-controlled data-stream generator as claimed in claim 5, characterised in that the control means comprises for at least two of the subgenerators $M_i$ an associated number selector $S_i$ for selecting the number $n_{i,j}$ from an associated group $H_i$ of different integer numbers; at least two of the groups $H_i$ being different.

7. A clock-controlled data-stream generator as claimed in claim 6, characterised in that the finite state machine comprises a feedback shift register.

8. A clock-controlled data-stream generator as claimed in claim 7, characterised in that the feedback shift register is a linear feedback shift register associated with a characteristic polynomial $$f(x) = x^k + \sum_{i=0}^{k-n} a_i x^i,$$

$1 \leq n < k$, the linear feedback shift register comprising K sequentially arranged storage cells $p_0$ to $p_{K-1}$, $p_0$ being the low-order cell from which the output data item is supplied; the linear shift register being operative to provide the n-th data item as output data item in response to the trigger to transit in time from t to t+1 performing the following shifting of data items between the storage cells in parallel:

$$p_i^{(t+1)}=p_{i+n}^{(t)}, \text{ for } i=0 \text{ to } k-n-1;$$

$$p_i^{(t+1)} = \sum_{j=0}^{k-n} a_j p_{j+i+n-k},$$

for i=k−n to k−1.

9. A method for generating an output stream of data items, each of at least one bit in synchronisation with a clock trigger; the method comprises:

generating a control stream of control data items, each of at least one bit, in synchronisation with the clock trigger; and generating a plurality of data streams $DS_i$ of data items, each of at least one bit; each data stream $DS_i$ being generated according to a respective predetermined algorithm $A_i$;

controlling the generation of data items for at least one of the data streams $DS_i$ in dependence on the control data items of the control stream; and forming the output stream by combining the generated data streams $DS_i$;

characterised in that the step of controlling the generation of data items for at least one of the data streams $DS_i$ comprises selecting for the data stream $DS_i$ a number n from an associated group of different integer numbers; at least two numbers of the groups being larger than zero; the selection being in dependence on the control data items of the control stream; and the step of generating a data item for the data stream $DS_i$ comprises generating as a next data item of the data stream $DS_i$ a data item which according to the algorithm $A_i$ would be the n-th data item successive to a last generated data item.

* * * * *